United States Patent
Ma

(10) Patent No.: US 10,129,510 B2
(45) Date of Patent: Nov. 13, 2018

(54) INITIATING HUMAN-MACHINE INTERACTION BASED ON VISUAL ATTENTION

(71) Applicant: Samsung Electronics Co., Ltd., Suwon-si, Gyeonggi-do (KR)

(72) Inventor: Tao Ma, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/349,899

(22) Filed: Nov. 11, 2016

(65) Prior Publication Data

US 2017/0242478 A1     Aug. 24, 2017

Related U.S. Application Data

(60) Provisional application No. 62/297,076, filed on Feb. 18, 2016.

(51) Int. Cl.
| | |
|---|---|
| H04N 9/31 | (2006.01) |
| G06F 3/01 | (2006.01) |
| G06F 3/16 | (2006.01) |
| B25J 11/00 | (2006.01) |
| G03B 21/00 | (2006.01) |
| H04N 7/18 | (2006.01) |

(52) U.S. Cl.
CPC ........ *H04N 9/3152* (2013.01); *B25J 11/0015* (2013.01); *G03B 21/00* (2013.01); *G06F 3/013* (2013.01); *G06F 3/167* (2013.01); *H04N 7/18* (2013.01); *H04N 9/3141* (2013.01); *H04N 9/3147* (2013.01); *H04N 9/3185* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| 8,292,433 | B2 | 10/2012 | Vertegaal |
| 9,110,635 | B2 | 8/2015 | Knox et al. |
| 9,311,527 | B1 | 4/2016 | Yin et al. |
| 2007/0237516 | A1 * | 10/2007 | Seita .................... G03B 17/18 396/287 |
| 2013/0304479 | A1 | 11/2013 | Teller et al. |
| 2014/0145935 | A1 | 5/2014 | Sztuk et al. |
| 2014/0168056 | A1 | 6/2014 | Swaminathan et al. |
| 2014/0310256 | A1 | 10/2014 | Olsson et al. |
| 2016/0062459 | A1 | 3/2016 | Publicover et al. |
| 2016/0154460 | A1 | 6/2016 | Von Liechtenstein |

* cited by examiner

*Primary Examiner* — Gustavo Polo
(74) *Attorney, Agent, or Firm* — Innovation Counsel LLP

(57) ABSTRACT

A device for interacting with a user is presented. The device includes a target area, a sensor coupled to the target area, wherein the sensor detects whether a human is present in a predefined proximity region and detects a direction of visual attention given by the human in the predefined proximity region, a processor coupled to the sensor and making a determination that the user's visual attention is in a direction of the target area for a minimum visual contact period, and an input engine that is activated based on the determination.

14 Claims, 20 Drawing Sheets

Code Sample

```
void neckSpinClock(float angle, int speedLevel) //command ID: B7
{
    float motor_speed = speed2Level(speedLevel);   //convert speed level to real motor speed
    float motor_time = angle* motor_speed;  //estimate how long the motor spin in millisecond
    float cur3 = servoEaser3.getCurrPos();   //get current motor angle
    servoEaser3.easeTo(cur3 + angle, motor_time); //send command to make motor spin
    while(servoEaser3.hasArrived() == 0) { //keep moving till it reaches to the angle
        servoEaser3.update();
        if(servoEaser3.getCurrPos() > spin_motor_limit1)  //stop spinning if hit the limit
            break;
    }
}
```

FIG. 15

INITIATING HUMAN-MACHINE INTERACTION BASED ON VISUAL ATTENTION

CROSS-REFERENCE TO RELATED APPLICATION(S)

This application claims the benefit of U.S. Provisional Application No. 62/297,076 filed on Feb. 18, 2016, which is incorporated by reference herein.

BACKGROUND

Increasing popularity of portable electronics demands that electronic devices become capable of handling more functions. One of the areas of development is human-machine interaction based on voice or motion. When a user provides a request to a machine by providing a voice command instead of touching or typing on a visual display, a user's interaction with a machine becomes more similar to human-to-human interaction, therefore being more natural and intuitive.

One of the challenges in implementing the human-machine voice communication is knowing when the machine should be waiting for a user command. As it is seldom the case that a user is constantly and continuously talking to his machine, it is not efficient for the machine to be constantly listening for commands. However, it is equally important that the machine not miss a communication from a user when it comes. Existing voice interaction engines such as AMAZON ECHO® and GOOGLE NOW™ address this problem by requiring a trigger word from the user as a signal to the machine to receive a user command of the trigger word. This trigger-word mechanism prevents false triggering and saves processing power. However, it has the disadvantage of feeling unnatural to the user, who has to say the trigger word every time he wants to interact with his machine.

Apple's Siri voice engine does not require a trigger word but instead relies on a button touch to start waiting for a user command. While some users may prefer this touch-based initiation to trigger words, neither option is ideal as they both require the user to do something that he would not do when interacting with another human. A more natural way of initiating machine interaction without wasting processing power or compromising accuracy is desired.

SUMMARY

In one aspect, the present disclosure pertains to a device for interacting with a user. The device includes a target area, a sensor coupled to the target area, a processor coupled to the sensor, and an input engine. The sensor detects whether a human is present in a predefined proximity region and detects a direction of visual attention given by the human in the predefined proximity region. The processor makes a determination that the user's visual attention is in a direction of the target area for a minimum visual contact period, and based on this determination, the input engine is activated.

In another aspect, the present disclosure pertains to a method of transitioning an input engine from sleep mode to interactive mode. The method includes identifying a user eye, determining a direction of user's visual attention based on movement of the eye; and activating an input engine to receive input if the visual attention is in a predefined direction for a minimum visual contact period.

In yet another aspect, the present disclosure pertains to a non-transitory computer-readable medium storing instructions for executing the above method.

BRIEF DESCRIPTION OF THE DRAWINGS

FIG. 15 depicts an exemplary code sample for motion API.

DETAILED DESCRIPTION

The system and method disclosed herein detects human visual attention and uses it to initiate human-machine interaction. With the visual attention-based initiation method, a user would not need to take an unnatural step of manually starting the interaction by saying or doing something he would not do if he were interacting with another human person. The machine may give a signal to the user that it is listening when the machine recognizes the visual attention as being directed at it.

Figure 1:
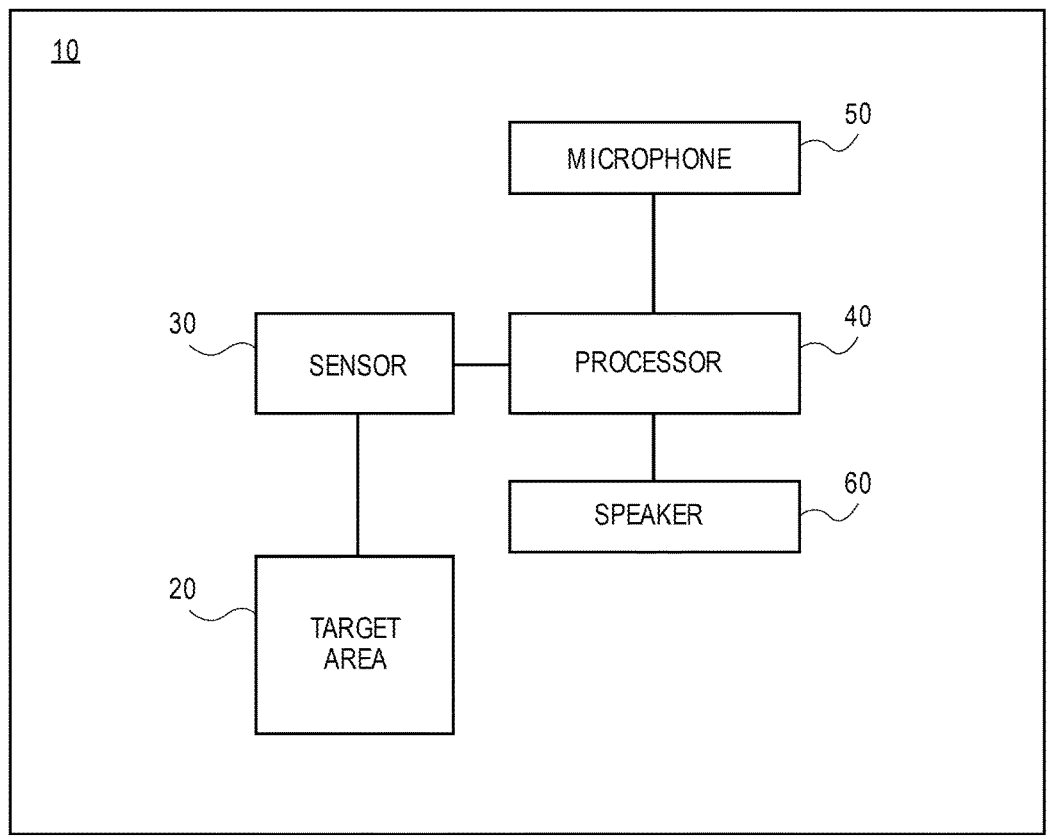
FIG. 1 depicts an interactive device according to one embodiment.

FIG. 1 depicts an interactive device 10 according to one embodiment. As shown, the device 10 includes a target area 20, a sensor 30, a processor 40, a microphone 50, and a speaker 60 connected to one another. The sensor 20 may be any sensor capable of proximity sensing and eye tracking, including but not limited to a camera, an infrared sensor, or a laser sensor. The processor 40 may use any suitable computer vision algorithm to determine a user's proximity to the device 10 and to determine the direction of the user's visual attention. The target area 20 may have a display device or some other component that would cause the user to look at it when he wants to interact with the device 10. For example, where the device 10 is a robot, the target area 20 may be made to look like the robot's face with eyes. The sensor 20 may be positioned behind or near the target area 20 to accurately track the user's visual attention. In some embodiments, there may be multiple sensors 20 positioned in different parts of the device 10.

Figure 2:
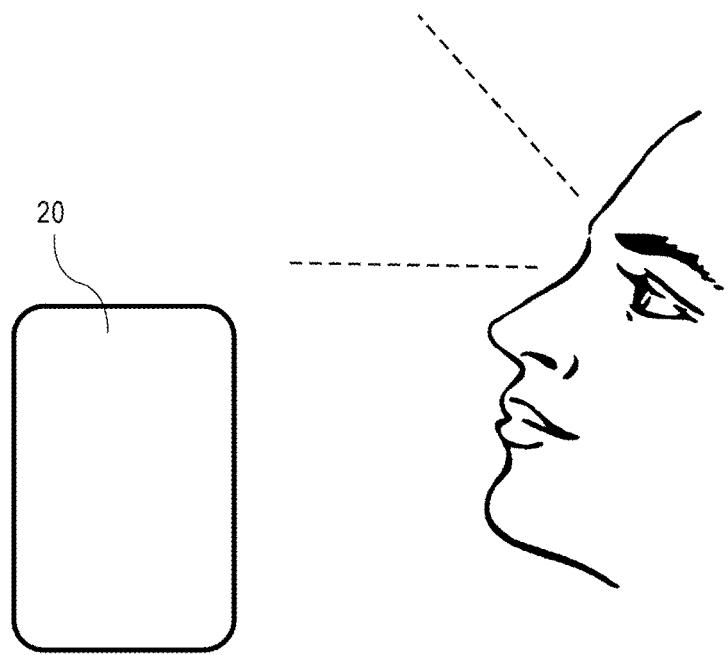
FIG. 2 depicts a situation where the user's visual attention is not on the target area.

FIG. 2 depicts a situation where the user's visual attention is not on the target area 20. The processor 30 of the device 10 periodically checks to see if a user is looking at it, and if not, it remains in sleep mode.

Figure 3:
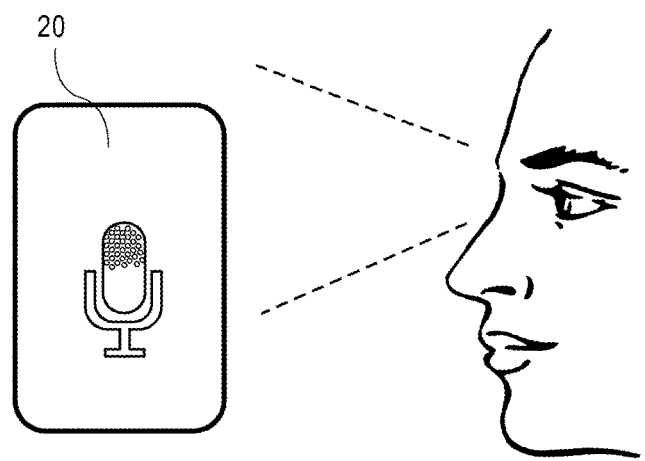
FIG. 3 depicts a situation where the user's visual attention is on the target area.

FIG. 3 depicts a situation where the user's visual attention is on the target area 20. Upon determining that the user's visual attention is on the target area 20, the processor transitions the device 10 from sleep mode to interactive mode. In interactive mode, the microphone 50 is activated to receive user's voice. In the particular example of FIG. 3, an image of a microphone is shown on the target area 20 to let the user know that the device 10 is in interactive mode and listening.

Figure 4:
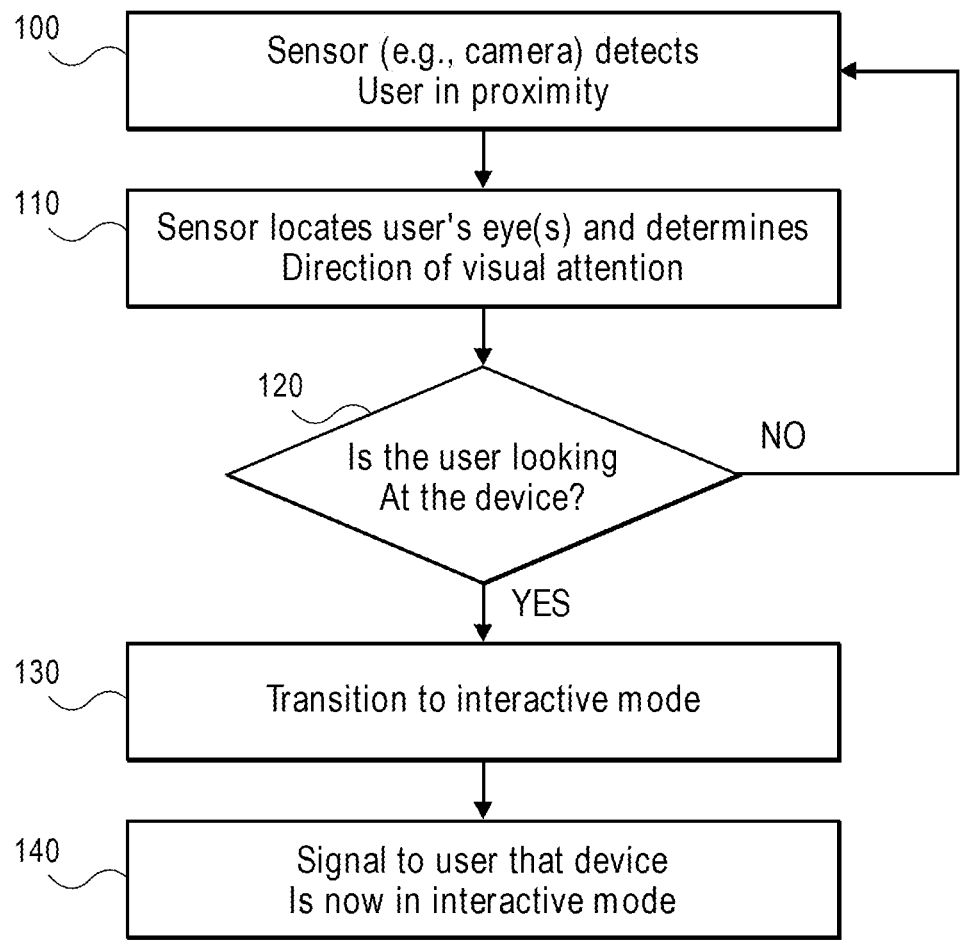
FIG. 4 is a flowchart depicting how the device decides to transition from sleep mode to interactive mode according to one embodiment.

FIG. 4 is a flowchart depicting how the device 10 decides to transition from sleep mode to interactive mode in accordance with one embodiment. As mentioned before, the sensor 20 periodically (e.g., at a regular time interval such as every few seconds) checks to see if there is a potential user in its proximity (at 100). Upon determining that there is a user in proximity (e.g., within a predetermined distance), the sensor 20 locates the user's eye(s) and determines the direction of the user's visual attention or gaze (at 110). If the user looks in the direction of the target area 20 for a preset minimum visual contact period (e.g., 3 seconds) (at 120), processor transitions the device 10 into interactive mode (at 130). In the interactive mode, the microphone and voice input engine are triggered and the device 10 waits for a voice command from the user. If, on the other hand, the user is not looking at the device 10 (at 120), the processor 30 continually checks to see if the user's visual attention is now directed at the device 10.

Upon the device's transition to interactive mode (at 130), a signal may be generated to let the user know that the interactive mode is ON and the device 10 is listening (at 140). The signal may be visual, such as an image of a microphone being displayed, the eyes of a robot becoming brighter, and the color or brightness of the target area 20 changing. The signal may be an audio signal, such as a short chime sound or a word "Hi" generated by the speaker 60. The signal may include a movement of a part of the device 10. For example, where the device 10 is a robot, the robot may tilt, raise, or turn its head or change its facial expression (e.g., eyes open wider, quick two blinks of the eyes). In an embodiment where there are multiple sensors 20, if the user is behind or to the side of the robot's front face, the robot may turn around to "look at" the user to signal that it is in interactive mode.

Although the description herein focuses on voice interaction, the device and method described herein is not limited to visual attention triggering only voice interaction. In some embodiments, once the device 10 is in interactive mode, it may be ready to receive and process visual/motion input (e.g., a wink, a wave of a finger, and pointing of a finger) or temperature input as well as audio input. Suitable types of sensors may be incorporated into the device 10 to allow the desired type of input to be received and processed.

Figure 5:
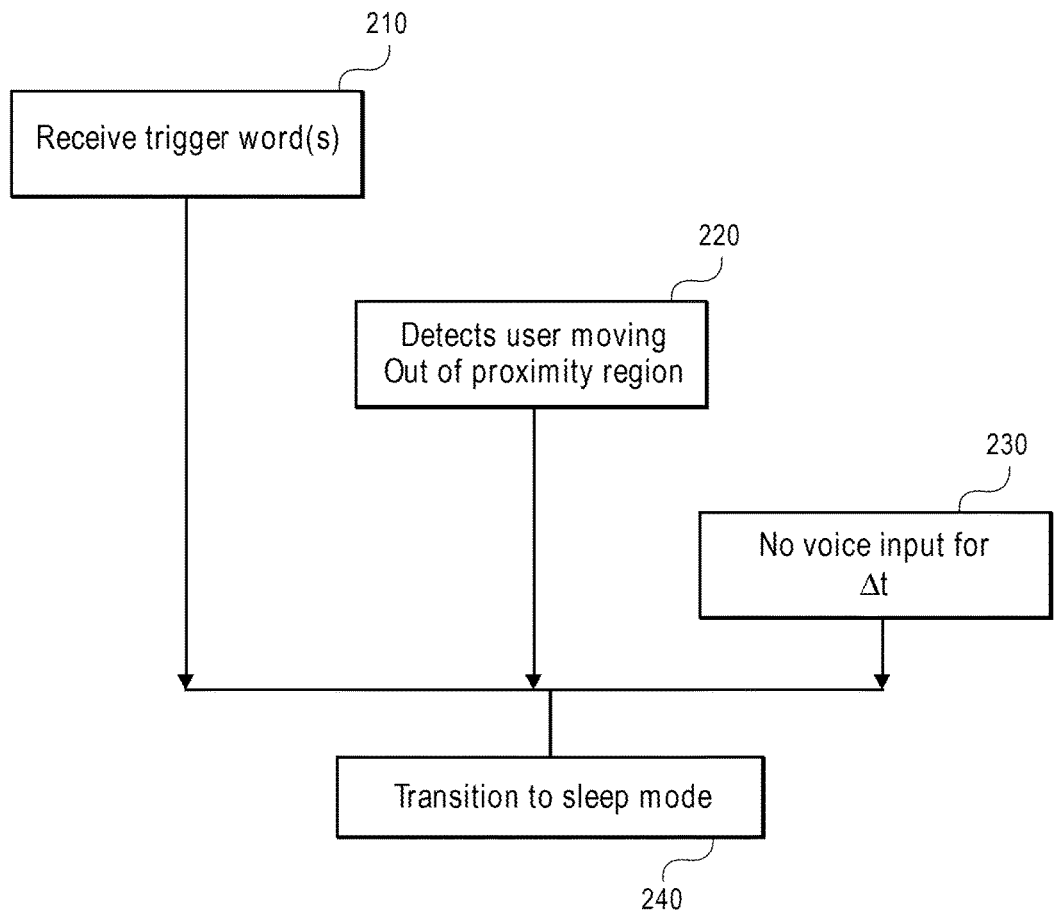
FIG. 5 is a flowchart depicting how the device decides to transition from interactive mode to sleep mode according to one embodiment.

FIG. 5 is a flowchart depicting how the device 10 decides to transition from interactive mode to sleep mode in accordance with one embodiment. As shown, there may be more than one trigger for transitioning from interactive mode to sleep mode. In the particular embodiment that is depicted, hearing a trigger word like "Bye" or a phrase like "Talk to you later" or "See you later" (at 210) may cause the transition. The sensor 20, which may continually be monitoring the user's proximity even in interactive mode, may detect that the user has walked away outside the predefined interaction distance from the device 10 (at 220), and this detection may cause the transition. Also, as mentioned above, the microphone 50 is activated in interactive mode. When no voice is received by the microphone 50 for a predetermined length of time $\Delta t$ (at 230), the processor 30 may conclude that the interaction is over and transition to sleep mode (at 240). Depending on the embodiment, one of these conditions being satisfied may trigger the transition to sleep mode or it may take at least two of these conditions being fulfilled for the transition to occur.

In one embodiment, the device 10 is implemented as a robotic companion device that may include being an emotive personal assistant, a smart home hub, and an Internet Protocol (IP) camera. The device 10 may include far-field voice recognition capability and natural language understanding, a knowledge engine to answer different questions in different types of domains (e.g., weather, general knowledge, traffic, sports, and news), an Internet of Things (IOT) hub functionality to control other devices such as light and thermostat and send notifications from various sensors, a user interface configured to display animations and emotional expressions, and a camera for monitoring the surroundings (e.g., a home). This camera may be a high-definition (HD) camera for wide angle viewing that is separate from the sensor 20.

An example robotic companion device may include the following hardware components:
- A system-on-chip (SOC)/central processing unit (CPU) (e.g., SAMSUNG™ ARTIK™ 5) that runs the system and controls software and includes connectivity;
- A camera, such as an 1080-pixel IP camera (e.g., OV2718) that provides multi-axis camera movement for streaming and security features;
- A display screen such as a curved/flat display (e.g., a 2-inch screen, 360×480 resolution, 300 pixels per inch (PPI)) that displays notifications and animations;
- A speaker (e.g., 2 watts) to play music and also play back text to speech response;
- A motor (e.g., 4 brushless direct current (DC) gear motors) to drive movements;
- An encoder/potentiometer (e.g., 4 rotary encoders or potentiometers) to precisely control movements;
- A motor drive board to drive the motors;
- A microphone array (e.g., 2-6 array microphone system with noise cancellation digital signal processing) to receive voice input and enable accurate and reliable far-field voice recognition;
- A charging dock;
- A gear box (e.g., 4 high-torque gear assemblies) that provides adequate torque and speed to provide smooth movements;

A Gimbal/Stewart platform that provides a desired range and degrees of motion for the interactive device;

A pinion (e.g., 2-pinion gears) that transfer and provide coupling with actuated parts;

A support shaft (e.g., 2 support shafts) that provide support and coupling with actuated parts;

A speaker mesh (e.g., 1 metal round hole mesh) that provides aesthetic and acoustic enhancements; and A plastic shell body (e.g., 2 plastic outer shell pieces) as the exterior surface of the interactive device to provide protection.

Figure 6:
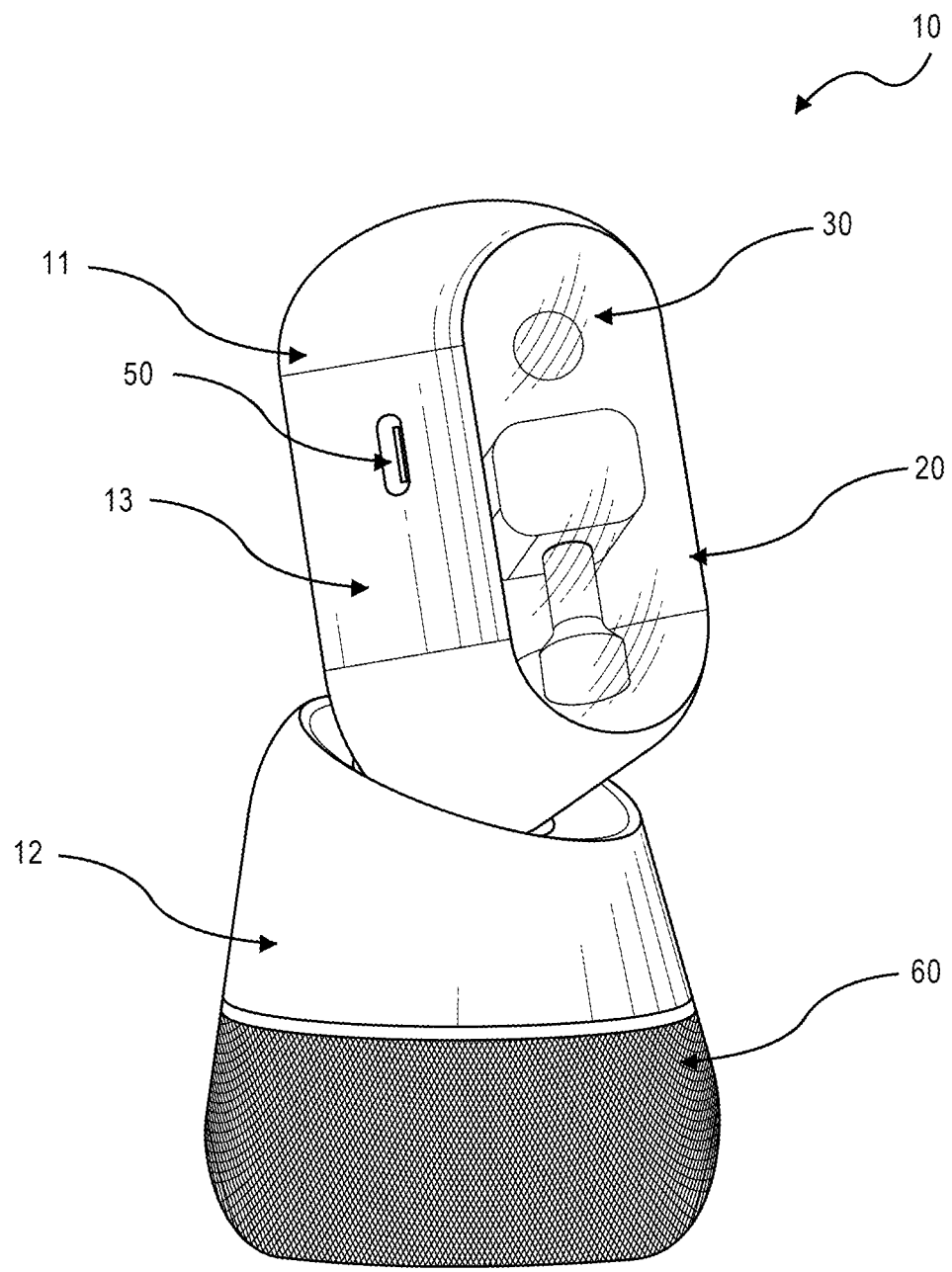
FIG. 6 depicts an exemplary device according to one embodiment.

FIG. 6 depicts an exemplary device 10 in accordance with one embodiment. The device 10 as shown includes a head 11 and a body 12. The head 11 includes a head shell 13 and the target area 20 that includes a user interface (UI). The sensor 30, which is a camera in this particular embodiment, is positioned behind and on the inside of the target area 20. The microphone 50 is positioned to the side of the target area 20 to resemble "ears." In this particular embodiment, the speaker 60 is positioned near the body 12. It should be understood that the components of the interactive device 10 may be arranged differently without deviating from the scope of this disclosure. It should also be understood that while the description focuses on an embodiment of the device 10 that is a robotic companion, this is not a limitation and the device 10 may be any electronic device.

Figure 7A:
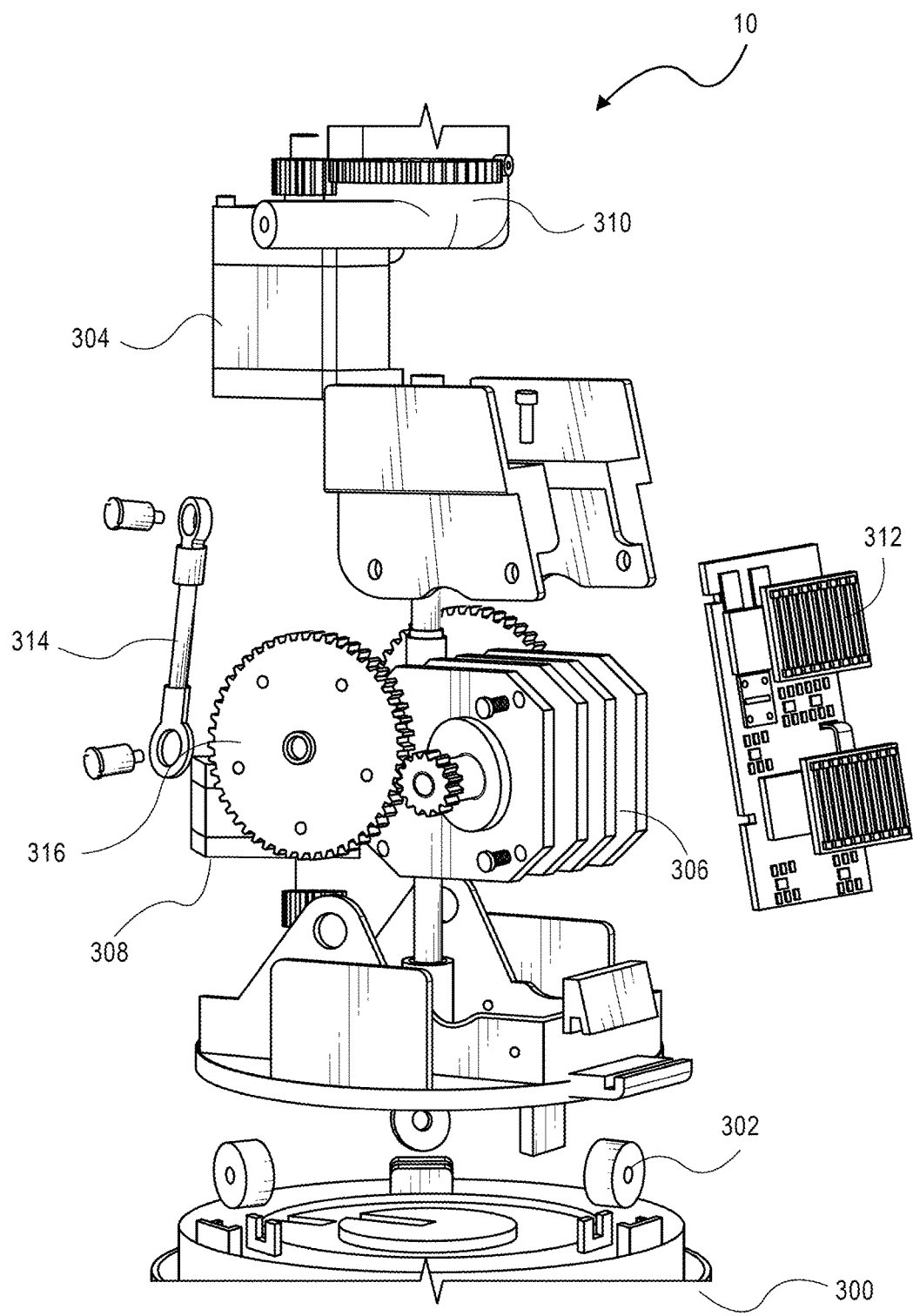
FIG. 7A and FIG. 7B depict an exploded view and a perspective view, respectively, of components within the device in accordance with one embodiment.
Figure 7B:
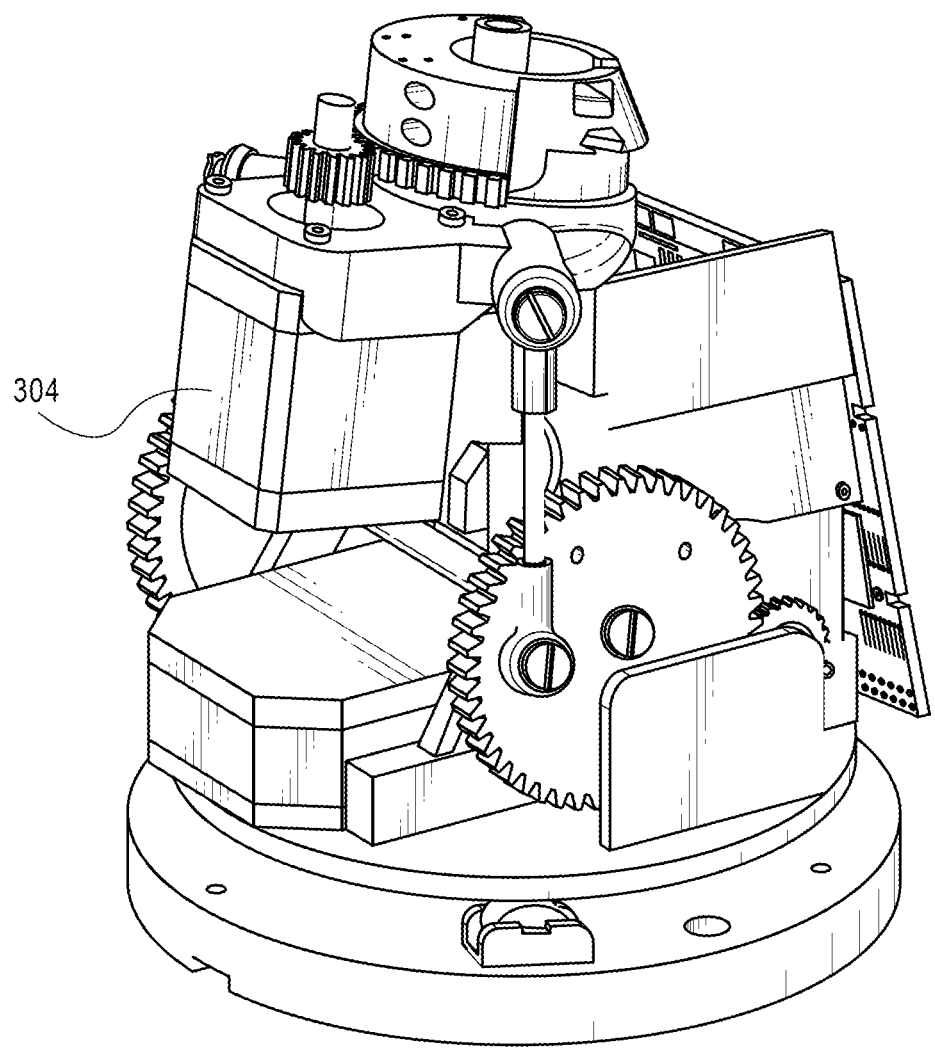

FIG. 7A and FIG. 7B depict an exploded view and a perspective view, respectively, of components within the device 10 in accordance with one embodiment. As shown, the device 10 rests on a base 300 for stability, and has rollers 302 that allows the body 12 to swivel. There are a plurality of stepper motors to enable movement of various parts: a first stepper motor 304 for head rotation, a set of second stepper motors 306 for head tilting, and a third stepper motor 308 for body rotation. Geared neck sub-assembly 310 and PCB sub-assembly 312 are incorporated into the device 10, as are a head tilt-control arm 314 coupled to the head tilt control gear 316.

Figure 8A:
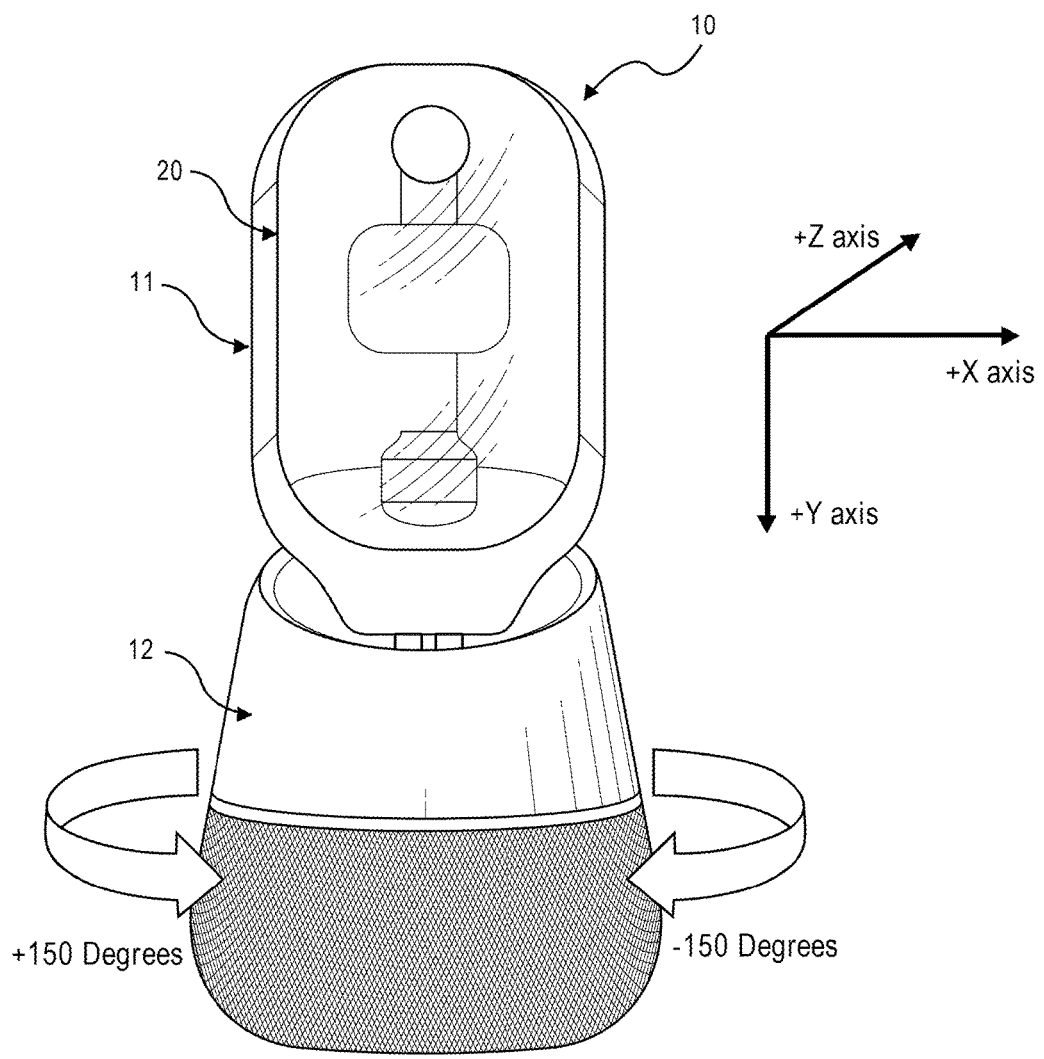
FIG. 8A and FIG. 8B depict a rotation range of the exemplary device according to one embodiment.
Figure 8B:
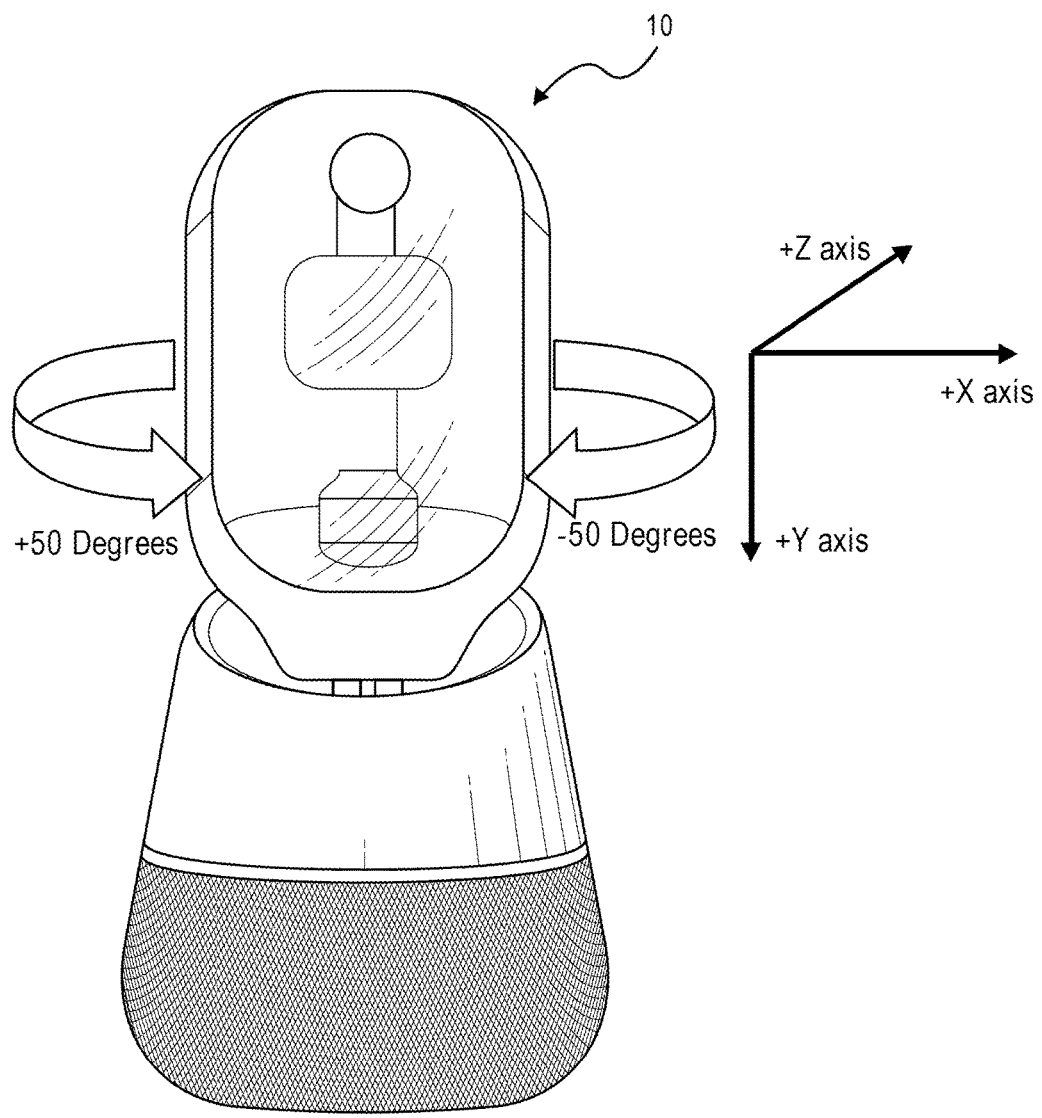

FIG. 8A and FIG. 8B illustrate a rotation range of the exemplary device 10 in accordance with one embodiment. This example embodiment includes a body 12 that is configured to rotate about a y-axis with a total of 300 degrees of movement (+150 degrees to −150 degrees) while the base 300 and the head 11 remain in position. The head 11 and the body 12 can be controlled separately. FIG. 8B illustrates another embodiment in which the head 11 rotates about a y-axis by a total of 100 degrees of movement (+50 degrees to −50 degrees) while the body 12 remains in position. It should be understood that both the body rotation depicted in FIG. 8A and the head rotation depicted in FIG. 8B may be combined into a single embodiment.

Figure 9A:
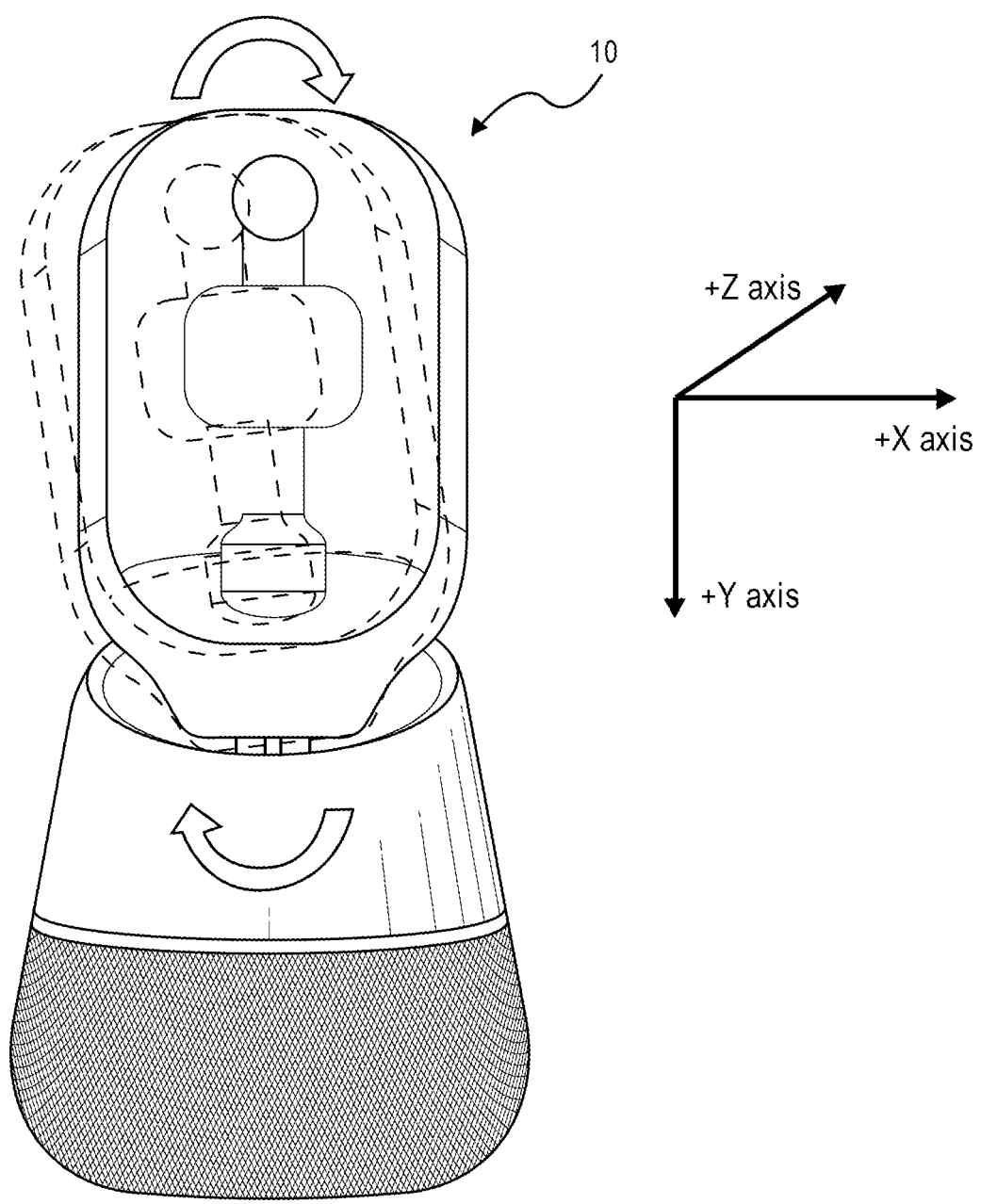
FIG. 9A and FIG. 9B illustrate a rotation range of the device according to another embodiment.
Figure 9B:
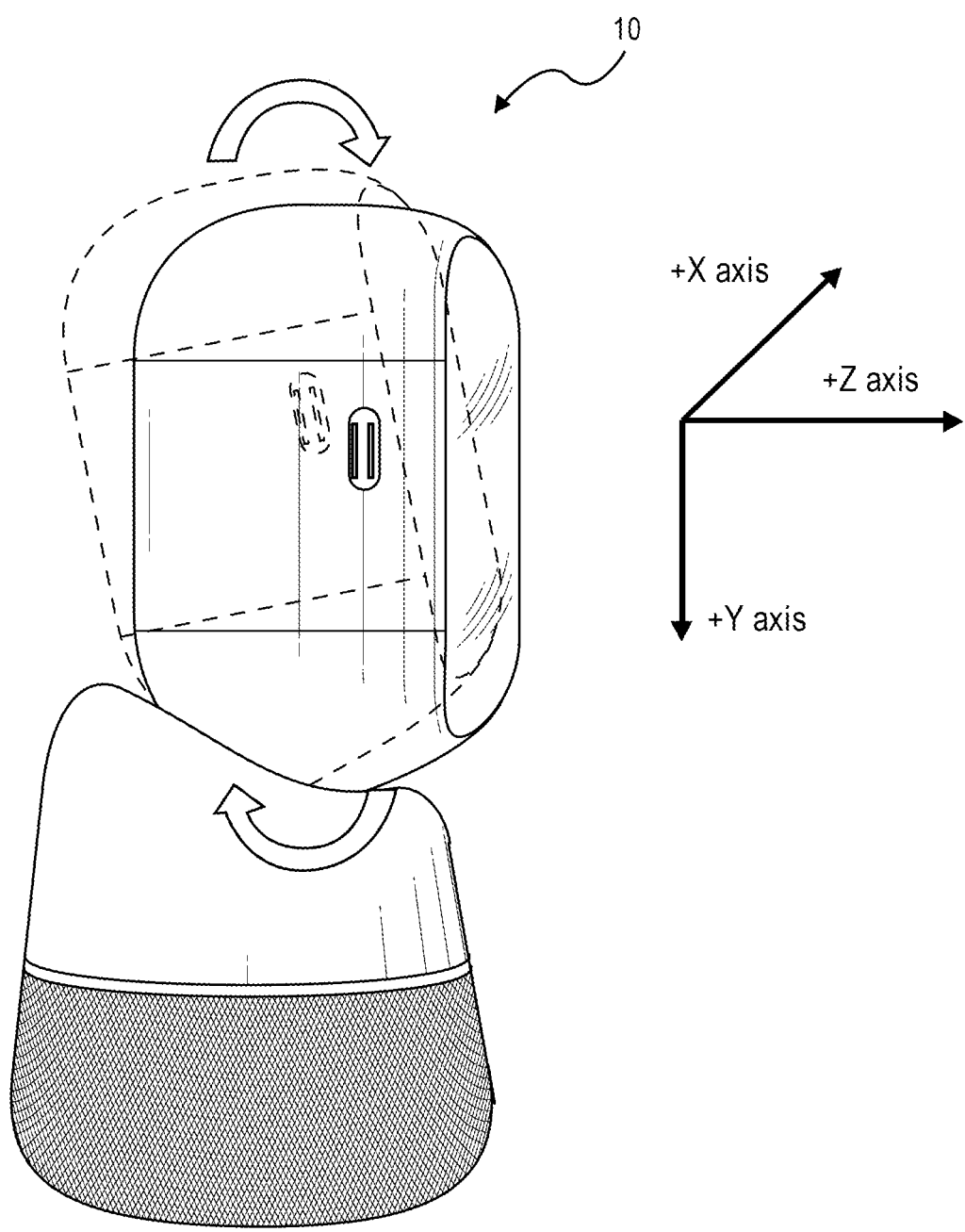

FIG. 9A and FIG. 9B illustrate a rotation range of the interactive device 10 in accordance with another embodiment. In the embodiment of FIG. 9A, the head 11 is configured to rotate about a z-axis with a total of 50 degrees of movement (+25 degrees to −25 degrees). In the embodiment of FIG. 9B, the head 11 is able to rotate about the x-axis as though the head 11 is tilting back and forth.

Figure 10:
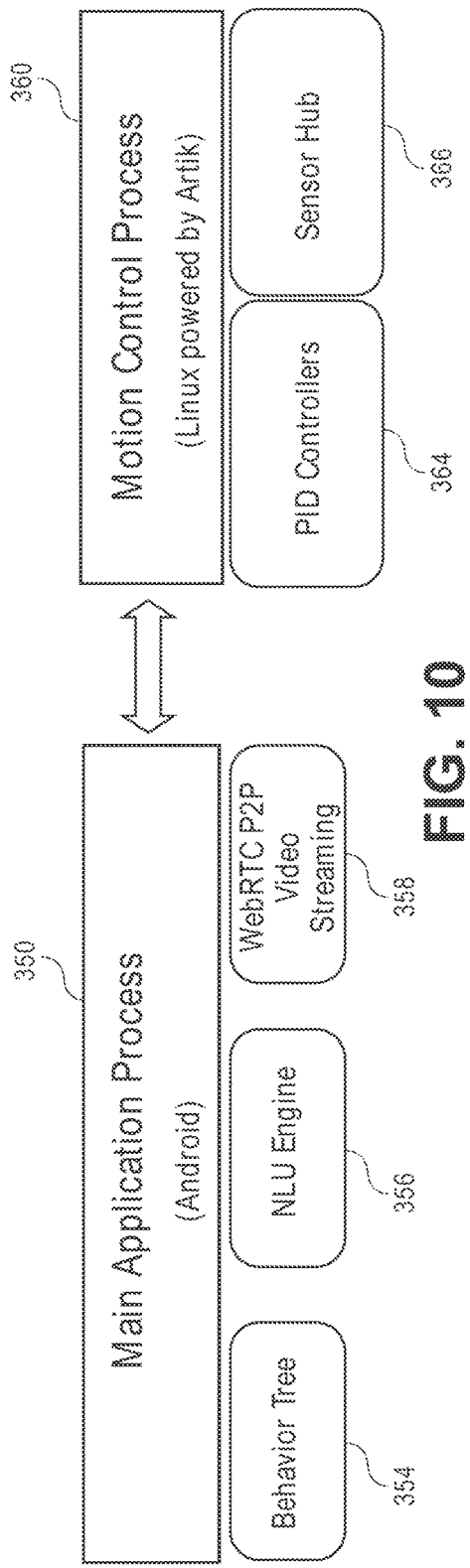
FIG. 10 depicts an exemplary block diagram of the system architecture according to one embodiment.

FIG. 10 depicts an exemplary block diagram of the system architecture in accordance with one embodiment. The system includes a main application process module 350 that communicates with a motion control process module 360. The main application process 350 includes a behavior tree module 354, a natural language understanding (NLU) module, engine 356, and a web real-time communications (webRTC) peer-to-peer (P2P) video streaming module 358. The behavior tree module 354 manages and coordinates all motor commands to create a desired display and a desired motor animation. The NLU engine 356 processes speech input that includes performing signal enhancement, speech recognition, NLU, service integration, and text-to-speech (TTS) response. The webRTC P2P video streaming module 358 manages the video stream from the interactive device to various sources and companion applications.

The motion control process module 360 includes a proportional-integral-derivative (PID) controller 364 and a sensor hub 366. The PID controller controls a plurality of motors (e.g., 4 motors) precisely using a feedback loop and uses analog positional encoders to accurately track motion. The sensor hub 366 provides sound source localization using energy estimation, and may be used to send other sensor events to the main application process module 350.

Figure 11:
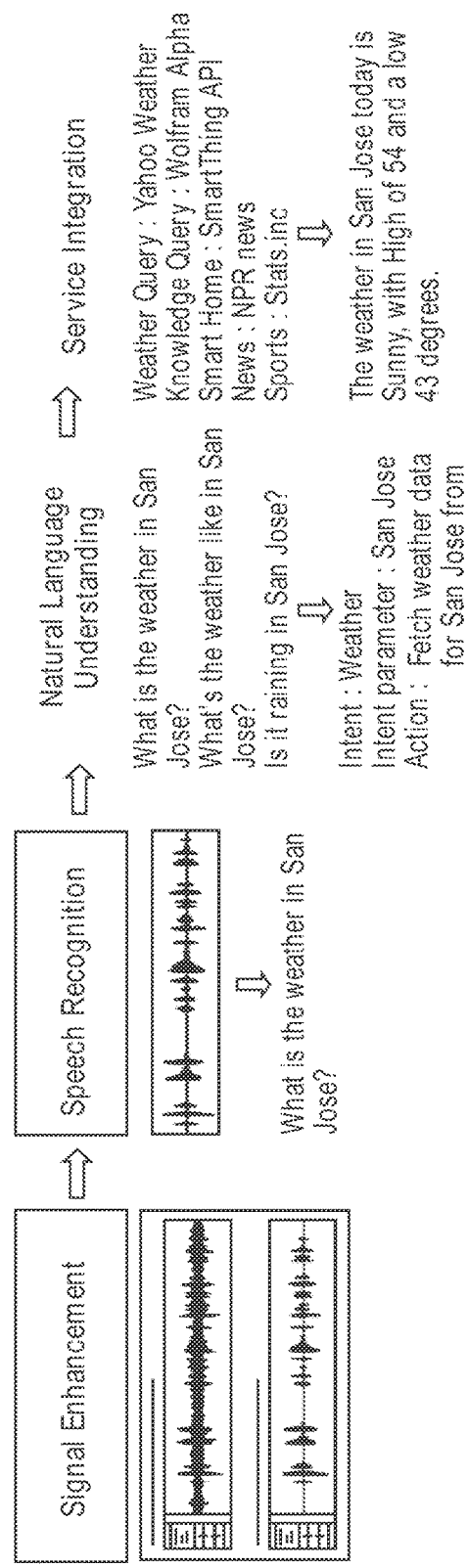
FIG. 11 depicts an exemplary block diagram of NLU engine architecture according to one embodiment.

FIG. 11 depicts an exemplary block diagram of NLU engine 356 architecture in accordance with one embodiment. The NLU engine 356 may provide signal enhancement by enhancing the accuracy and enabled far-field voice recognition. The NLU engine 356 uses multiple microphone arrays to perform beam forming to identify the sound source, then uses the direction information of the sound source to cancel out noise from other directions. This function improves overall speech recognition accuracy.

The NLU engine 356 may further provide speech recognition by converting the enhanced speech signal into text based on a well-defined corpus of training data to identify the right word and sentence compositions. The NLU engine 356 may further provide NLU to map the recognized text to perform a desired action using NLU tools. The NLU tools can map different phrases and language constructs that imply the same intent to a desired action. For example, the NLU engine 356 receives a voice message from a user, "What is the weather in San Jose?" The NLU engine 356 provides NLU to the voice message to derive an intent "weather," and intent parameter "San Jose," and performs a desired action to fetch weather data for San Jose, e.g. from YAHOO™ Weather.

Once the NLU engine 356 identifies the desired action based on the type of action, the system fetches data from different service/content providers. For example, the NLU engine 356 provides service integration with a plurality of content providers such as a weather query from YAHOO Weather, a knowledge query from WOLFRAIVIALPHA®, a smart home query from SMARTTHINGS™ API, a news query from NPR™ news, and a sports query from STATS™. The present system formats the data so that a TTS engine uses the data to output a reply to the user via a speaker with a natural tone and speed. For example, the present system formats a data reply, "The weather in San Jose today is Sunny, with High of 54 and a Low of 43degrees" to output the data reply as an audio message via the speaker.

Figure 12:
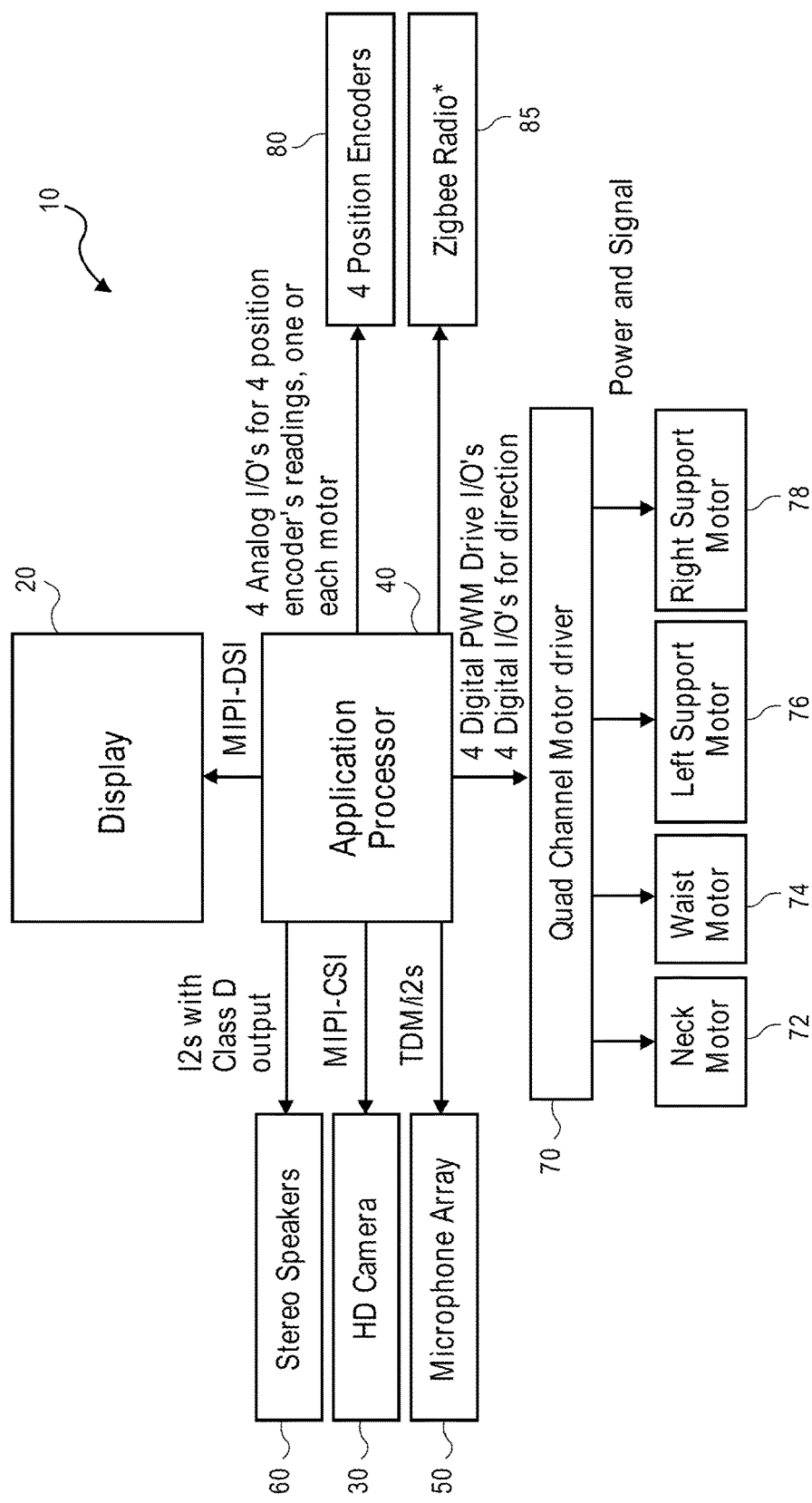
FIG. 12 depicts an exemplary block diagram of hardware architecture of the device according to one embodiment.

FIG. 12 depicts an exemplary block diagram of hardware architecture of the device 10 in accordance with one embodiment. FIG. 12 is a more specific embodiment of what is depicted in FIG. 1, and shows the Application processor 40 as being in communication with the target area 20 (which is a display device in this embodiment), the sensor 30 (which is an HD camera in this embodiment), a microphone 50 (which is part of a microphone array in this embodiment), and speakers 60. For the embodiment of FIG. 12, the processor 40 also communicates with a Quad Channel Motor driver 70, which in turn controls a neck motor 72, a waist motor 74, a left support motor 76, and a right support motor 78. The processor 40 may also communicate with encoders 80 and Zigbee radio 85.

Figure 13:
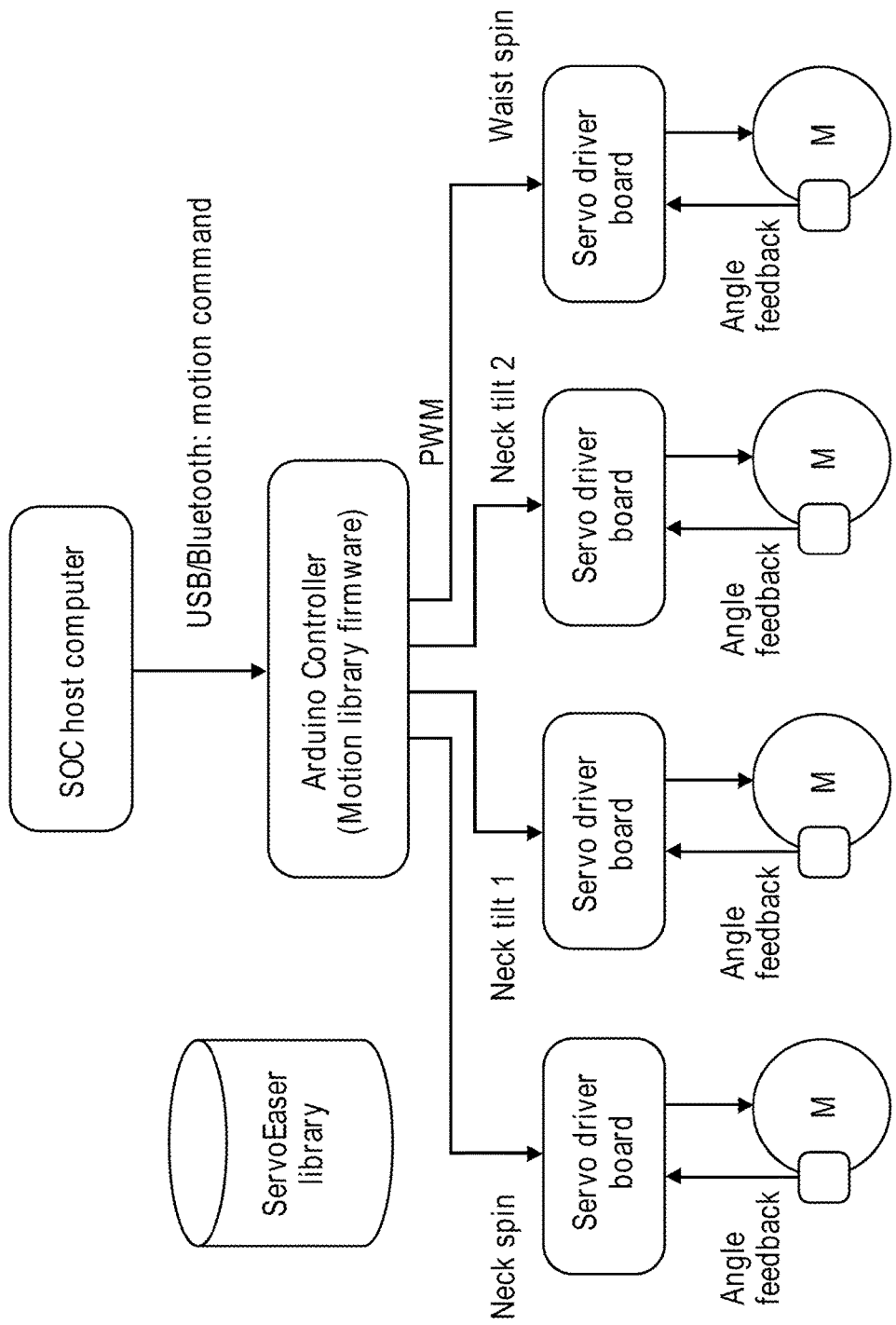
FIG. 13 depicts an exemplary block diagram of robotic architecture of the present device according to one embodiment.

FIG. 13 depicts an exemplary block diagram of robotic architecture of the present device in accordance with one embodiment. As shown, the SOC host computer communicates with the controller to move different parts of the device 10. A ServoEaser library may be used to smooth motor movements by giving acceleration effect.

Figure 14:
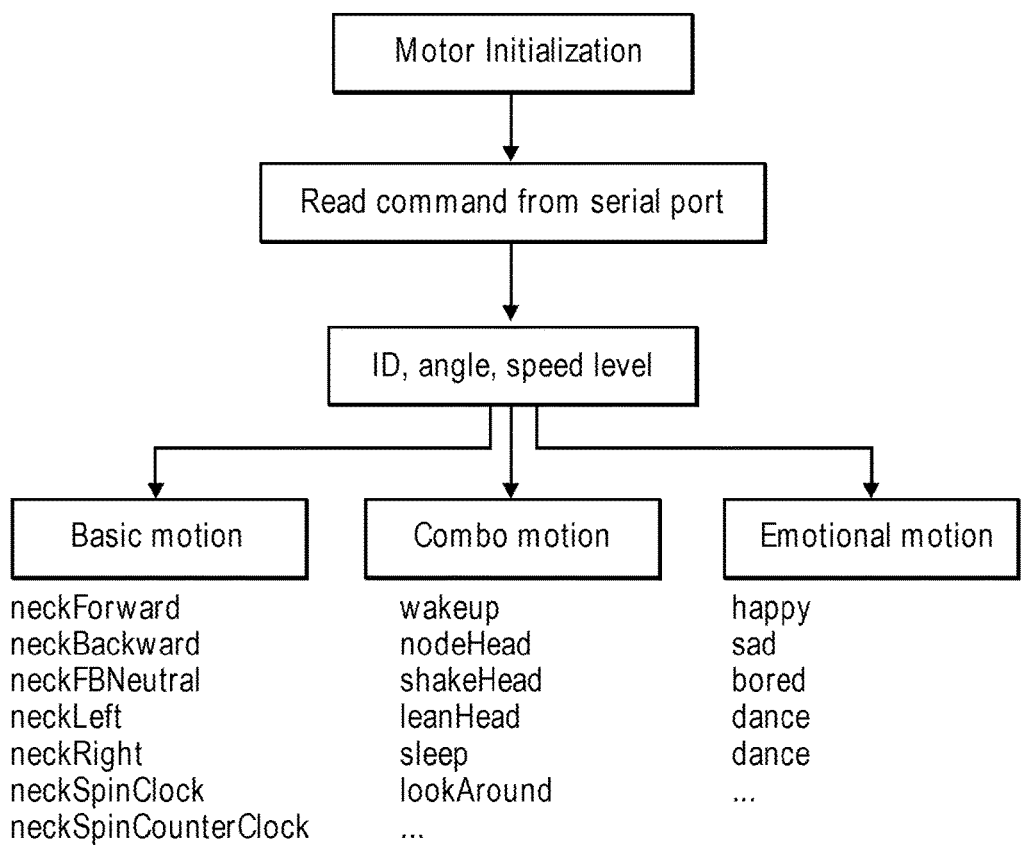
FIG. 14 depicts an exemplary flow chart of performing a desired motion by the device according to one embodiment.

FIG. 14 depicts an exemplary flow chart of performing a desired motion by the device 10, in accordance with one embodiment. The device 10 includes a plurality of motion command application interfaces (APIs) to perform a respective desired action. For example, a motion command "B1, 30.2, 3" means the interactive device 10 performs a "neck-Forward" function to 30.2 degrees (relative angle) with a speed level of 3. In another example, a motion command "E1" means the interactive device performs a "happy1" function. FIG. 15 depicts an exemplary code sample for motion API.

Figure 16:
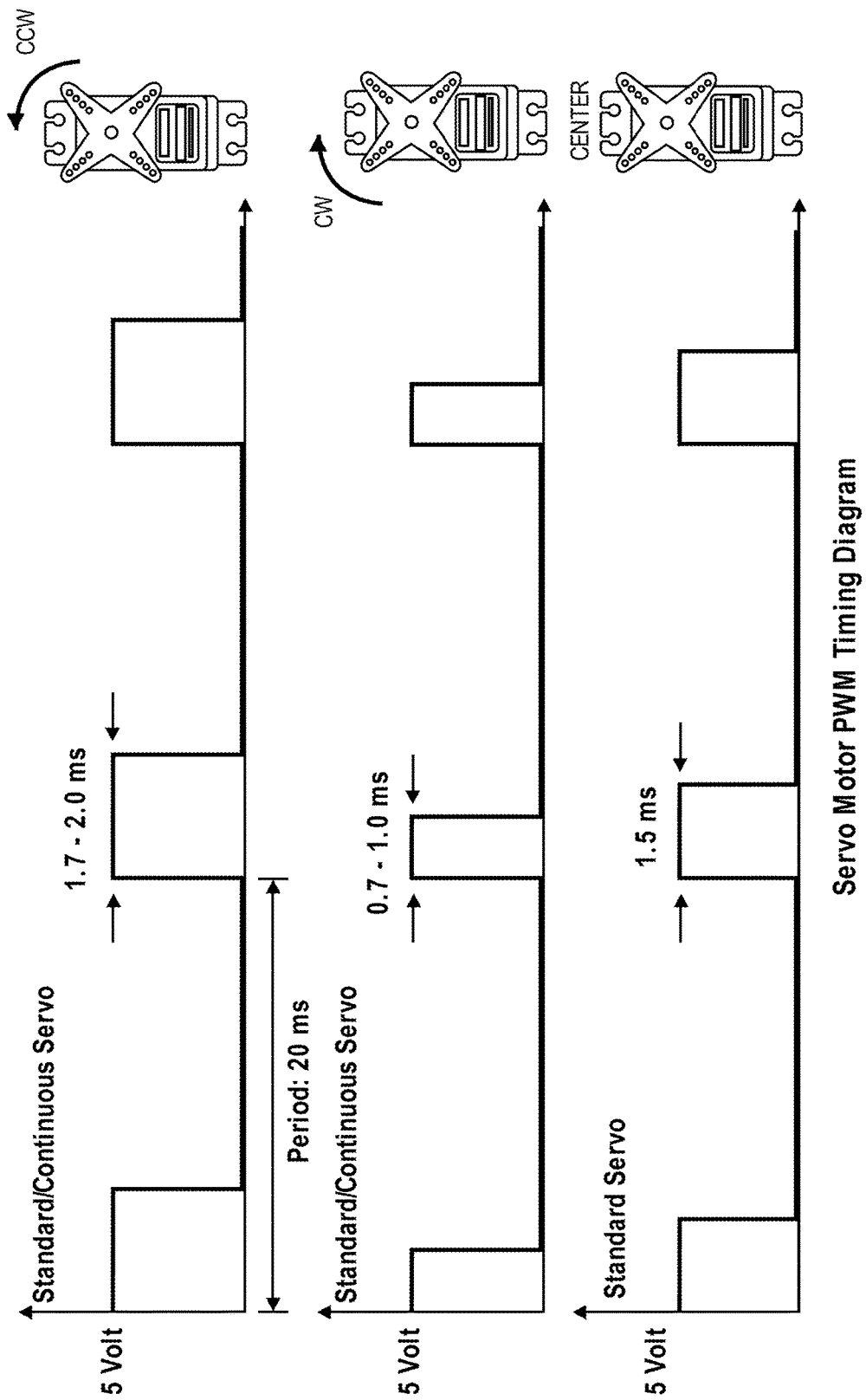
FIG. 16 depicts an exemplary timing diagram for servo motor pulse width modulation (PWM) according to one embodiment.

FIG. 16 depicts an exemplary timing diagram for servo motor pulse width modulation (PWM) in accordance with one embodiment. The servo driver board has PID control to stabilize motor rotation. The real time angle values are selected using a potentiometer.

Figure 17:
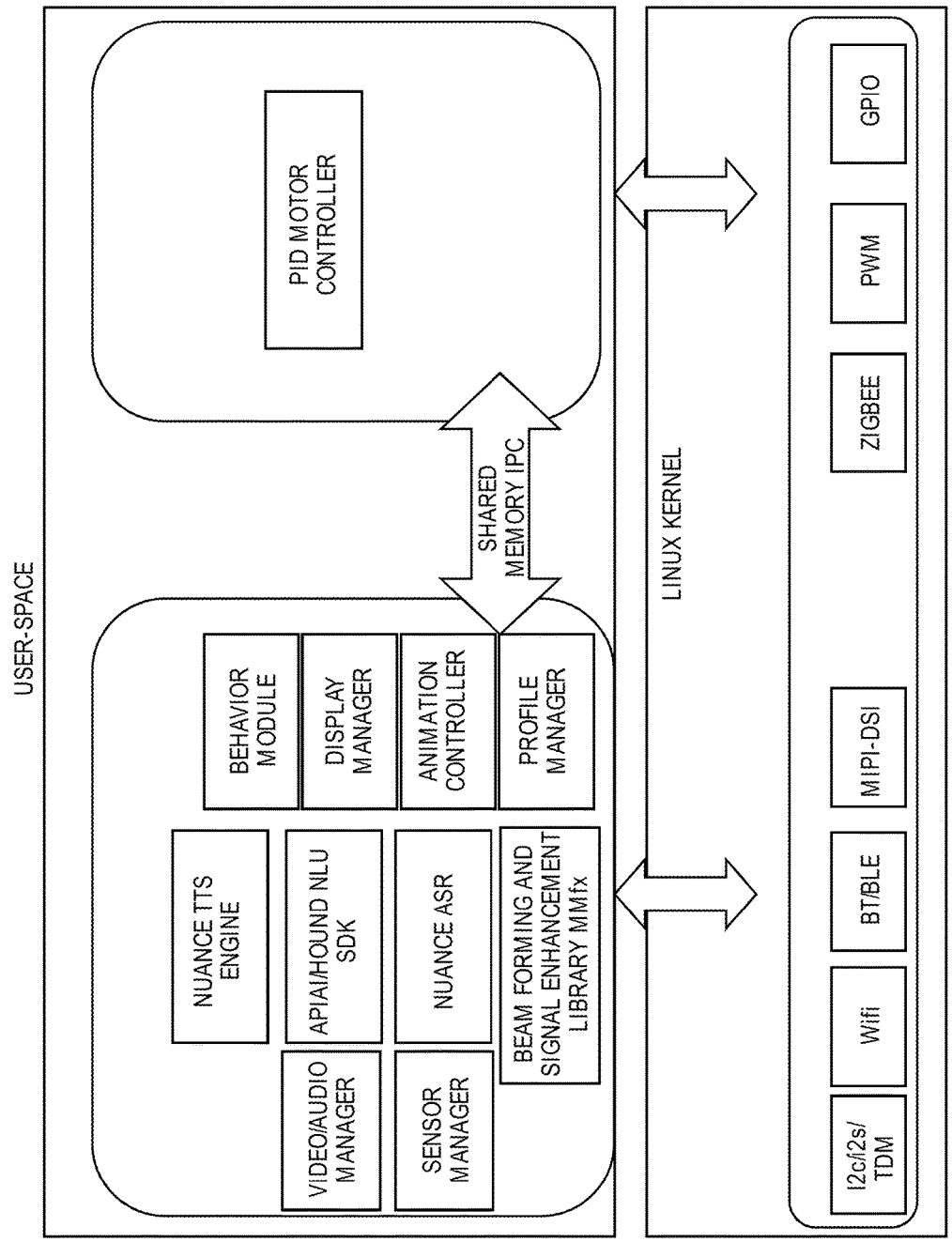
FIG. 17 depicts an exemplary block diagram of the present system according to one embodiment.

FIG. 17 depicts an exemplary block diagram of the present system in accordance with one embodiment. In this embodiment, the device 10 provide security by monitoring users and activity within a boundary area (e.g., within a home), provides a connectivity to other devices and appliances, and provides direct interfacing for queries and tasks. For example, let's suppose the present interactive device 10 receives a voice input from a user to pre-heat an oven to 180 degrees. The interactive device 10 communicates with the oven device to turn on the oven at 180 degrees setting and further provides the user with an audio reply to confirm that the oven has been set to 180 degrees. The device 10 may further receive an acknowledgement message from the oven that that oven has reached 180 degrees so the interactive device 10 can send a second audio reply to the user to notify him that the oven has reached 180 degrees.

Figure 18:
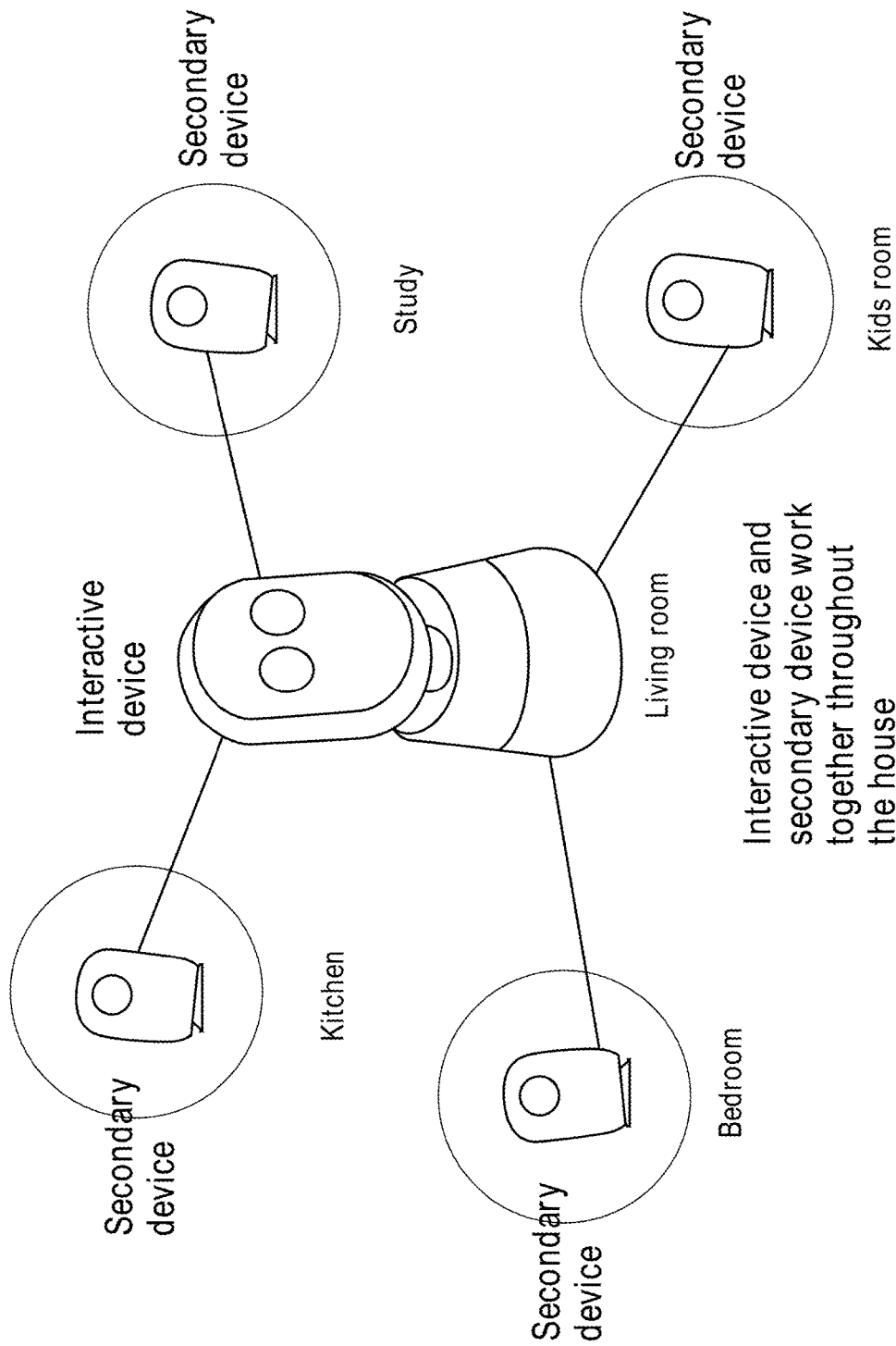
FIG. 18 depicts an exemplary diagram of connecting the device to multiple secondary devices according to one embodiment.

According to one embodiment, the device 10 is further connected to one or more secondary devices to receive or provide information to the secondary device. FIG. 18 depicts an exemplary diagram of connecting the device 10 to multiple secondary devices in accordance with one embodiment. The device 10 may be wirelessly connected to each secondary device via a Wi-Fi connection or a Bluetooth connection. The secondary device includes a video camera, a microphone array, and a speaker. For example, a video camera of the secondary device captures and detects a broken window. The secondary device sends the image of the broken window to the present device 10 that may further transmit the image to the user's mobile device.

Figure 19:
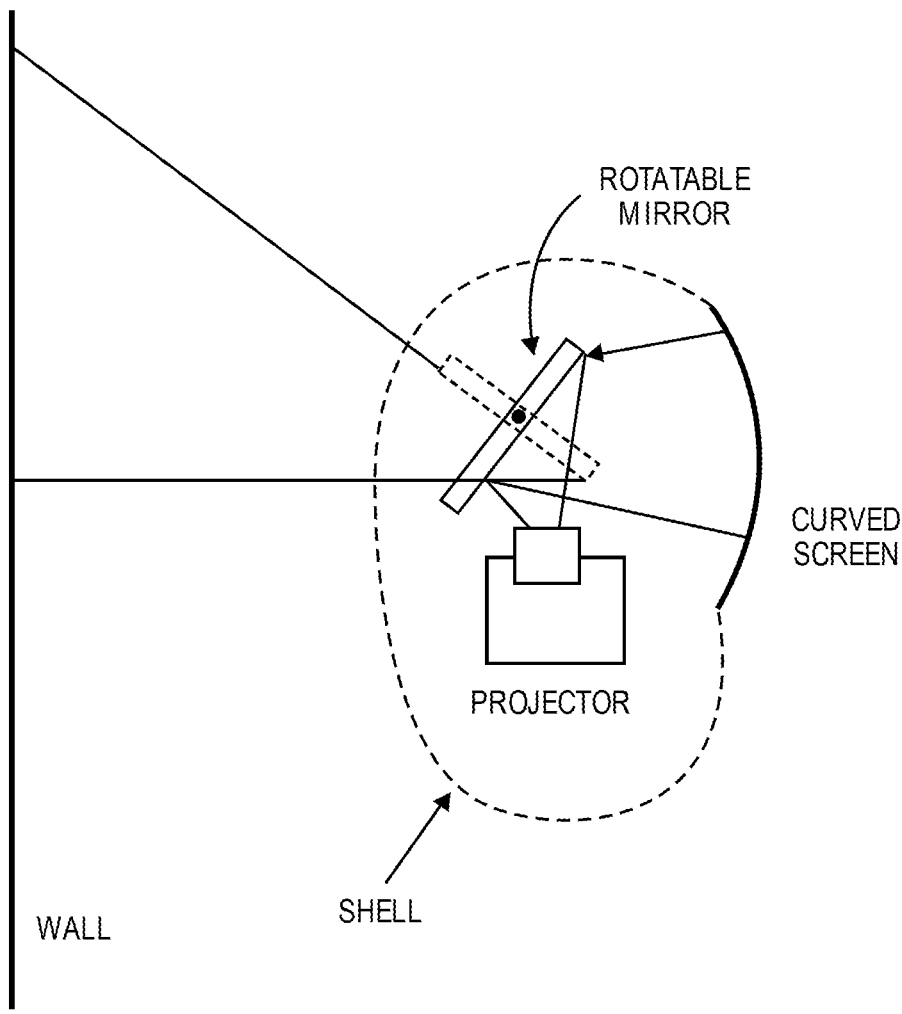
FIG. 19 depicts an exemplary diagram of a multi-modality display feature in the device according to one embodiment.

In accordance with one embodiment, the device 10 provides a multi-modality display system to project visual content (e.g., a movie, information, a UI element) on areas with a different display mode. FIG. 19 depicts an exemplary diagram of a multi-modality display feature in the device 10 in accordance with one embodiment. The device 10 may include an optical projector that is placed within the head shell 13 with the lens of the projector facing up. A curved projector screen may be installed on the internal curved surface of the head shell 13. In one embodiment, the head projector to either the curved projector screen on the internal curved surface of the head shell 13 or a surface (e.g., a wall surface) that is external to the device 10. The head shell 13 may include a transparent window portion so that the projector can project the visual content on an external surface (e.g., a wall) through the transparent window. In one embodiment, the multi-path optical guide assembly is a rotatable mirror. The optical guide assembly may direct light from the project to the curved projector to display various UI elements, e.g. eyes, and facial expressions. The optical guide assembly may direct light to the surface external to the present interactive device to display visual content such as information and media (e.g., a movie).

According to one embodiment, the device 10 includes one or more sensors to determine whether to project visual content on the curved projector screen or to the wall based on various decision factors including but not limited to user distance, a type of visual content (e.g., a movie), and a specified usage parameter. For example, if the present interactive device detects a user who is relatively close based on the user being within a predefined threshold radius, the present interactive device 10 displays the visual content on the curved projector screen. In another example, if the type of visual content is a movie, the present device 10 displays the visual content on the wall. The device 10 may further determine a mode and a resolution of the projector based on the type of visual content, a proximity to a projection surface, and an optical property of the projector.

In another example, if the camera of the device 10 detects that the amount of light in a room is too much (too bright) compared to a threshold reference value, the device 10 displays the visual content on the curved projector screen. The rotation of the optical guide assembly may be implemented by a set of action mechanism and control circuits. To give a smooth display mode transition, the projector may be dimmed out when the mirror is rotating.

According to another embodiment, the device 10 provides feedback in response to a voice input by a user to establish that it is engaged for human voice interaction. The feedback includes one or more visual feedback, audio feedback, and movement feedback. For example, when a user provides a trigger voice command such as "Hello," the device 10 may tilt its head shell 13 to one side to simulate listening, display wide open eyes on a UI on the head shell as a listening facial expression, and provide a voice feedback. The movement feedback may include raising the head shell and turning the head shell 13 in the direction of the sound source. According to one embodiment, the device 10 includes a 4-degree of freedom (DOF) mechanical structure design.

As mentioned above, according to another embodiment, the sensor 30 (e.g., the camera) in the device 10 detects that a user is coming closer. The device 10 allows the sensor 30 to further locate the eye of the user and estimate the visual attention of the user. If the device 10 determines that the user has sufficient visual contact, the device 10 triggers the voice input engine and waits for a voice command from the user. According to one embodiment, the device 10 includes a sensor 30 and a microphone array 50 to detect a particular user.

According to yet another embodiment, the device 10 receives a natural gesture input and provides a feedback to the gesture input. Table 1 illustrates various gestures and their associated meaning, and the corresponding feedback from the device 10.

TABLE 1

| Gesture | Meaning | Reaction from Device 10 |
|---|---|---|
| Index finger of one hand is extended and placed vertically in front of lips, with the remaining fingers curled toward the palm with the thumb forming a fist | Request for silence | Mutes, or stops moving |
| Connect thumb and forefinger in a circle and hold other fingers up straight | Okay | Accepts user commands or executes instructions |
| Index finger sticking out of the clenched fist, palm facing the gesturer. The finger moves repeated towards the gesturer (in a hook) as though to draw something nearer | Beckoning | Turns to focus on action issuer from others |
| Natural number one through ten | Number gestures | Inputs number or number-related commands |
| Raise one hand and then slap hands together | High five | Greeting, congratulations or celebration |
| Draw circle and triangle | Alarm state | Communicates with emergency provider |

According to one embodiment, the device 10 provides multi-user behavior and pattern recognition. The device 10 understands group behavior and individual preferences of each user based on interaction with each user. The device 10 provides a heuristic method to automatically learn by logging the time of day of interaction, duration of interaction, and a user identifier to determine the user's intrinsic pattern. The device 10 may further analyze group interactions between multiple users using a camera, to understand group structure and hierarchy. For example, the device 10 may classify a group of users sitting at a table as a family having dinner, which is then correlated with other logs such as a time of day and the number of people detected. This allows the device 10 to determine an average time of day that the family has dinner so that the device can provide information and services such as nutrition information, take-out service, recipes, etc.

In another embodiment, the device 10 determines that a user has interest in sports based on various factors such as detecting a type of sportswear on the user, and a frequency of voice input from the user associated with a particular sport. The device 10 may then provide sports information to the user, such as special events or calendar events.

According to one embodiment, the device 10 receives haptic and tactile interactions from a user to adjust a behavior, add a feature, control, and convey a message. For example, a user taps the head shell 13 of the device 13 to convey happiness or satisfaction. The device 10 detects the tap on the head shell 13 and changes its movement, animation, and its vocal response to the interaction. According to one embodiment, the device 10 provides emotion detection using voice, images, and sound to identify a user's emotional state. The device 10 may provide a behavior change based on a detected type of music. For example, the speaker of the device 10 provides a surfer-like voice when surf rock music is playing, and the of the present interactive device displays animations associated with the surf rock genre.

According to one embodiment, the device 10 synchronizes expression, movements, and output responses for multimodal interaction. The device 10 provides various techniques to ensure that each modality of output is synchronized to create the proper effect needed to create a natural interaction with the user. The techniques include buffered query response and preemptive motion cues. The device 10 synchronizes and coordinates functions of all the output modalities so that the final actuation is as natural as possible. For example, if the TTS engine's response from the server is slow, the device 10 includes a controller mechanism that automatically determines that time is required and starts an idle animation on the UI and a synchronized movement that shows a natural waiting behavior.

According to one embodiment, the device 10 provides automatic security profile creation and notification. The device 10 includes a high definition camera, a microphone array, actuators, and speakers to automatically determine and learn the security status of a location based on past history and trigger words. For example, the device 10 can learn that a desired word (e.g., help, danger) or loud noises (e.g., a sound above a predefined decibel threshold) are indicators for investigation, and switches into a tracking mode. This allows the device 10 to track the source of the sound/behavior and monitor the source. The device 10 may further analyze the voice signature to detect stress or mood.

The device 10 further includes a computing module to provide accurate and precise coordination between the computing module and the actuators. The camera and microphone in conjunction with the computing module identifies a position, direction, and a video stream of the area of interest and synchronizes with the actuating motors to keep track of the area of interest. The device 10 dynamically determines a point of interest to track, where the point of interest may be a sound or a specific action in the camera feed. According to one embodiment, the device 10 dynamically selects a desired modality of sensing. For example, the camera of the device 10 captures a dog barking since the dog is producing a loud uncommon noise and an unusual person moving through the home quietly. Although they are both analogous behavior, the device 10 dynamically determines that the camera tracks the unusual person rather than the sound emanating from the barking.

According to one embodiment, the device 10 provides machine-learning based sound source separation and characterization using an actuated microphone array. Sound source separation and acoustic scene analysis involves being able to distinguish different sound sources within a particular acoustic environment. The device 10 uses the microphone array that can be actuated based on a combination of beam forming and blind source separation techniques to identify the approximate location of different sound sources and then determine their general category type based on the supervised machine-learning model.

The actuated microphone array allows the device 10 to create a dynamic acoustic model of the environment. The device 10 updates the acoustic model and feeds data from the acoustic model into a blind source separation model that determines and learns different sound sources within the environment after a period of time. For example, the device 10 detects that there is a consistent buzz everyday at a specific time of the day. The device 10 has a trained model having common acoustic signals for common household noises (e.g., a sound of a blender running). The device 10 uses the trained model to determine and identify that the consistent buzz is potentially the sound of a blender. The device 10 can use the identified blender sound to create an acoustic map of the surrounding environment. The device 10 can associate the identified blender sound with a kitchen location. Thus, the device 10 can determine a geographical location of the kitchen based on the direction of the blender sound (using beam forming and localizing the blender sound). The device 10 may further analyze other sound sources within the surrounding environment to infer other sound sources and their respective locations; for example, a TV is associated with a living room and an air vent is associated with a ceiling. This allows better noise canceling and acoustic echo cancellation, and further enables the device 10 to create a model of the surrounding environment to facilitate other tasks carried out by the device 10.

In one embodiment, the device 10 detects a blender sound and does not identify the blender sound, the device 10 prompts the user to respond and identify the blender sound. The user may respond with a voice input that identifies the sound, for example "a blender." The device 10 receives the voice input, identifies the voice input as "blender" word, associates word with the blender sound, and stores this association.

According to one embodiment, the device 10 provides automatic kinematic movement and behavior creation based on manipulation of the device 10 by a user. This allows the device 10 to create a new actuated motion or a behavior. The user may begin the creation of a new motion behavior by setting the device 10 to a learning mode. Once the learning mode is initiated, the user moves an actuated part of the device 10 to a desired location at a desired speed (as if controlling the device 10 by hand, this may be either a single pose or a combination of different poses to create a behavior sequences). The user assigns a name to the behavior and identifies one or more key frames. The device 10 registers the behavior, and can execute the motion or poses associated with the behavior automatically.

According to one embodiment, the device 10 further provides inferred pose estimation of the robot based on a visual cue. A user may provide the device 10 with a movement/behavior by articulating a movement with a similar degree of freedom as the device 10. The device 10 captures the movement with an inbuilt camera, analyzes the captured movement, automatically infers the movement, and determines a method of achieving the movement using its actuation mechanism. For example, the device 10 captures a video feed of a pose performed by a user. The device 10 analyzes the video feed of the pose, and determines the specific poses, angle, and speed at which the actuating motors need to be triggered to create a closest approximation of the pose. According to one embodiment, the device 10 learns language based on voice, face, and lip recognition.

The present disclosure may be embodied in many different forms and should not be construed as being limited to the embodiments set forth herein. In this disclosure, example embodiments are described in detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the present disclosure.

The electronic devices or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some portions of the above descriptions are presented in terms of algorithms and/or symbolic representations of operations on data bits that may occur within a computer/server memory. These descriptions and representations are used by those skilled in the art of data compression to convey ideas, structures, and methodologies to others skilled in the art. An algorithm is a self-consistent sequence for achieving a desired result and requiring physical manipulations of physical quantities, which may take the form of electro-magnetic signals capable of being stored, transferred, combined, compared, replicated, reproduced, and otherwise manipulated. Such signals may be referred to as bits, values, elements, symbols, characters, terms, numbers, or the like. These and similar terms are associated with appropriate physical quantities, and are used as representative labels for these quantities. Accordingly, terms such as "processing," "computing," "calculating," "determining," "displaying" or the like, refer to the action and processes of a computing device or system that manipulates data represented as physical quantities within registers/memories into other data that is also represented by stored/transmitted/ displayed physical quantities.

While the embodiments are described in terms of a method or technique, it should be understood that aspects of the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments of the system and method disclosed herein. Such apparatus may include circuits, dedicated and/ or programmable, to carry out operations pertaining to embodiments.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments.

What is claimed is:

1. A device for interacting with a user, comprising:
   a head connected to a body, the head comprising a shell and a target area formed as part of an outer surface of the shell, the target area comprising a display device, the head being configured to rotate about an axis with the body remaining in position;
   a sensor formed in the shell of the head and being coupled to the target area, wherein the sensor detects whether a human is present in a predefined proximity region around the target area and in response to the detecting that a human is present in the predefined proximity region around the target area, detects a direction of visual attention on the target area given by the human in the predefined proximity region;
   a processor coupled to the sensor and making a determination that the user's visual attention is in a direction of the target area for a minimum visual contact period, wherein the processor is configured to determine the user's position in the predefined proximity region and rotate the head so that the target area is in a predefined orientation with respect to the user, and wherein the processor is configured to determine the user's visual attention is in the direction of the target area by locating the user's eye and determining, based on movement of the eye, that the user is looking at the target area of the device for the minimum visual contact period; and
   an input engine that is activated based on the determination, wherein based on the determination, an image is shown by the display device on the target area to indicate the input engine is activated.

2. The device of claim 1 further comprising a microphone, wherein the input engine is a voice input engine that listens for a voice command from the user upon activation.

3. The device of claim 1, wherein the sensor comprises a camera.

4. The device of claim 1, wherein the sensor is positioned behind the target area.

5. The device of claim 1 further comprising another sensor positioned in a different part of the device.

6. The device of claim 1 further comprising an output mechanism for signaling to the user that the input engine is activated.

7. The device of claim 6, wherein the output mechanism comprises at least one of a speaker, a movable hardware part, and the display device.

8. The device of claim 1 further comprising a motor driver coupled to the processor to move hardware parts, wherein the motor driver and the processor are enclosed in the shell.

9. A method of transitioning an input engine between sleep mode and interactive mode, comprising:
   detecting a user is present in a predefined proximity region of a target area on a device, the device comprising a head connected to a body and the head comprising a shell, the target area being formed as part of an outer surface of the shell and comprising a display device, the head being configured to rotate about an axis with the body remaining in position;
   determining the user's position in the predefined proximity region and rotating the target area to be in a predefined orientation with respect to the user;
   in response to the detecting that the user is present in the predefined proximity region of the target area, identifying a user eye of the user present in the predefined proximity region of the target area;
   determining a direction of user's visual attention based on movement of the eye to determine that the user is looking at the target area of the device;
   activating the input engine to receive input in response to determining the visual attention is on the target area in a predefined direction for a minimum visual contact period; and
   in response to the activating, providing an image displayed by the display device on the target area to indicate the input engine is activated.

10. The method of claim 9 further comprising generating a signal that the input engine is in interactive mode upon transitioning from the sleep mode to the interactive mode.

11. The method of claim 10, wherein the signal is one or more of an audio signal, a visual display, and a hardware movement.

12. The method of claim 9 further comprising de-activating the input engine in response to receiving no input for a predetermined time duration.

13. The method of claim 9 further comprising de-activating the input engine in response to determining that the user is more than a predefined distance away from the target area.

14. The method of claim 9 further comprising de-activating the input engine in response to receiving a trigger word.

* * * * *